United States Patent
Staudigl et al.

(10) Patent No.: US 12,008,314 B1
(45) Date of Patent: Jun. 11, 2024

(54) GENERATION OF OPTIMIZED CLIENT RENDERING OPTIONS

(71) Applicant: Amazon Technologies, Inc., Seattle, WA (US)

(72) Inventors: Luitpold Staudigl, Bonn (DE); Pablo Barbachano, Berlin (DE); Muhammad Bilal Javed, Berlin (DE); Jochen Gast, Stuttgart (DE); Martijn Frederik Wouter van der Veen, Amsterdam (NL); Richard Droste, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/331,103

(22) Filed: May 26, 2021

(51) Int. Cl.
| | |
|---|---|
| *G06F 3/0482* | (2013.01) |
| *G06F 11/36* | (2006.01) |
| *G06F 40/143* | (2020.01) |
| *G06F 40/186* | (2020.01) |
| *G06F 40/197* | (2020.01) |

(52) U.S. Cl.
CPC ........ *G06F 40/197* (2020.01); *G06F 11/3688* (2013.01); *G06F 40/143* (2020.01); *G06F 40/186* (2020.01); *G06F 3/0482* (2013.01)

(58) Field of Classification Search
CPC .... G06F 40/169; G06F 3/0484; G06F 40/197; G06F 40/186; G06F 40/143; G06F 11/3688; G06F 3/0482
See application file for complete search history.

(56) References Cited

U.S. PATENT DOCUMENTS

| | | | |
|---|---|---|---|
| 8,117,531 B1* | 2/2012 | Lueck | G06F 40/58 715/204 |
| 9,111,007 B2* | 8/2015 | Carounanidy | G06F 16/9577 |
| 2020/0151387 A1* | 5/2020 | Choi | H04L 67/02 |
| 2021/0064516 A1* | 3/2021 | Gomez | G06F 11/3688 |

FOREIGN PATENT DOCUMENTS

WO  WO 01/25986  * 4/2001  ............. G06F 17/60

* cited by examiner

*Primary Examiner* — Kyle R Stork
(74) *Attorney, Agent, or Firm* — Klarquist Sparkman, LLP (57) ABSTRACT

Technologies are provided for generating optimized sets of client rendering options for renderable content items (such as images, videos, text, and audio). Rendering optimization parameters for a renderable content item can be determined by assessing the performance of processing requests and rendering content items using different file formats, quality settings, and/or other settings for the renderable content items. The rendering optimization parameters can then be used in combination with a rendering specification that is defined by a developer (such as an application developer, web page designer, or the like) in order to create an optimized set of client rendering options. The set of client rendering options can then be transmitted to one or more client computing devices. A client computing device that receives the set of client rendering options can select one or more of the options in order to render the renderable content item.

18 Claims, 8 Drawing Sheets

GENERATION OF OPTIMIZED CLIENT RENDERING OPTIONS

BACKGROUND

In some application or web page development environments, an application developer or web page designer can specify content (such as images, videos, and text) to be rendered on a client device as part of the application or web page. For example, some web page development environments can generate hypertext markup language (HTML) representations that will cause web browsers to render content based on specifications provided by a web page designer. One such HTML representation is an HTML picture element. Rather than specifying a single image to be loaded as part of a web page, an HTML picture element can allow a web page designer to specify multiple images that a web browser processing the picture element can select from based on capabilities of the web browser and the device on which the web browser is running.

DETAILED DESCRIPTION

The following description is directed to technologies for generating sets of client rendering options for renderable content items such as images, videos, text, and sounds.

In at least some scenarios, multiple rendering options for a renderable content item can be provided to a client computing device and the client computing device can select one or more of the rendering options based on capabilities of the client computing device. For example, a hypertext markup language (HTML) picture element can be used to specify multiple rendering options for an image. A web browser running on a client computing device can select one or more of the rendering options for rendering the image based on user preferences, capabilities of the web browser, and/or the client computing device.

It may be possible to determine some client rendering options for a renderable content item based on parameters provided by an application developer or web page designer. For example, if the developer/designer indicates that a renderable content item has a high rendering priority and/or is positioned above a fold of a web page, then a low resolution version of the content item may be included in the client rendering options. Such an embedded version of the content item may be rendered quickly while a higher resolution version of the content item is downloaded.

However, in at least some cases, determining a best set of rendering options to provide to a client computing device can require access to information that is not available at design time. For example, quality settings and file format options that are selected for a renderable content item can impact download and rendering performance based on a geographic location of a client computing device, a connection speed of the client computing device, and other factors which may vary widely among client computing devices and/or which may change over time.

At least some of the embodiments described herein can solve this problem by determining performance optimization parameters for a renderable content item, for example by assessing the performance of processing requests and rendering content items using different file formats and quality settings, and then using the rendering optimization parameters in combination with a rendering specification for the renderable content item that is specified by a developer or web page designer to create a set of client rendering options. The set of client rendering options can be transmitted to one or more client computing devices.

For example, a client rendering option template can be defined that can be used in combination with a rendering specification for a renderable content item and rendering optimization parameters to create the set of client rendering options for the renderable content item. In at least some embodiments, the set of client rendering options can change over time based on changing results of ongoing performance testing. For example, as connectivity and/or geographic location of a client computing device changes, impacts to request processing and rendering performance caused by these changes can be used to adjust the rendering optimization parameters. The adjusted rendering optimization parameters can then be used in combination with the rendering specification to generate a new set of client rendering options for the renderable content item.

Figure 1:
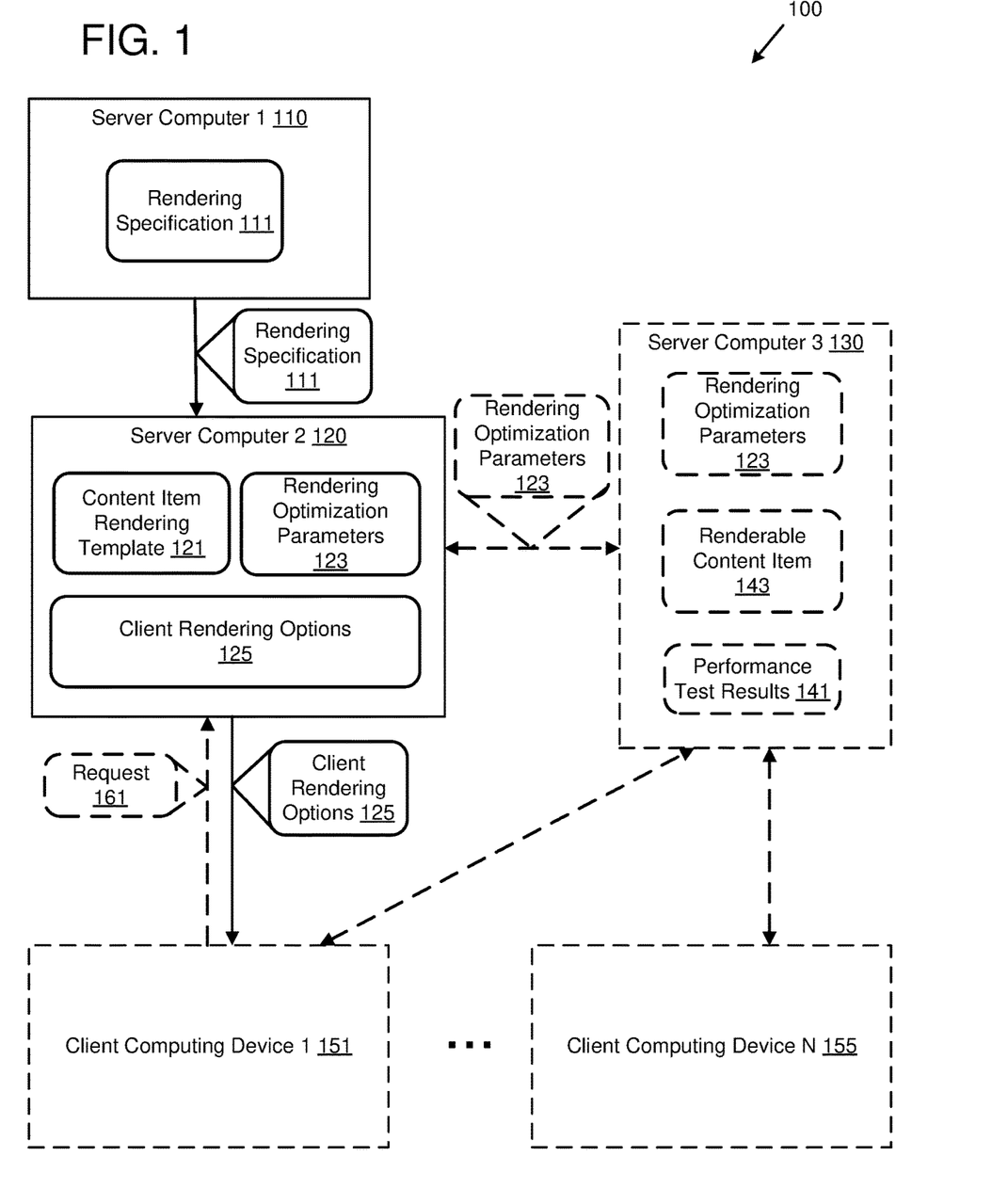
FIG. 1 is a system diagram depicting an example system configured to generate optimized client rendering options for a renderable content item.

FIG. 1 is a system diagram depicting an example system 100 configured to generate optimized client rendering options for a renderable content item (e.g., 143). In at least some embodiments, the renderable content item can be a renderable content item that is rendered as part of a web page.

The example system 100 comprises a first server computer 110 and a second server computer 120. The first server computer 110 is configured to generate a rendering specification 111 for the renderable content item and to transmit the rendering specification 111 to the second server computer 120. Additionally or alternatively, the second server computer 120 can be configured to retrieve the rendering specification from the first server computer 110. The server computer 110 can be configured to provide a user interface (such as a web page, etc.) through which an application developer (such as a web application developer) or a web page designer can provide input with which the server computer 110 can generate the rendering specification 111. The rendering specification 111 can specify various aspects of the renderable content item and/or information for rendering the renderable content item to a computer display. Example rendering contents of the rendering specification 111 include an identifier for the renderable content item, a default size or resolution (e.g., in pixel's, etc.) for the renderable content item, rendering style information for the renderable content item (such as whether a visual representation of the renderable content item is cropped, etc.), and/or information about a relative positioning of the renderable content item (e.g., whether the renderable content item is above a fold of a web page, whether the renderable content item should be rendered at a beginning of a web page load operation, etc.). In at least some embodiments, the rendering specification 111 can comprise values related to the renderable content item that are provided by a user, such as an application developer or a web page designer, via a user interface provided to the user by the server computer 110, and/or one or more other computing devices.

The rendering specification 111 can provide information relevant to the rendering of the renderable content item, but does not provide all information necessary to render the renderable content item. For example, the rendering specification 111 may include information about the renderable content item which an application developer or web page designer is readily capable of providing, but not information pertaining to optimal resolutions, quality settings, and/or file formats for efficiently rendering the renderable content item on various types of client computing devices that have different connection bandwidths and/or are located in various geographic locations.

The second server computer 120 is configured to receive the rendering specification 111 from the first server computer 110, and to generate a set of client rendering options 125 for the renderable content item. To generate the set of client rendering options 125 for the renderable content item, the server computer 120 can use the rendering specification 111, rendering optimization parameters 123, and a template 121. The set of client rendering options 125 can be associated with different quality and/or file format options for rendering the renderable content item. For example, in an embodiment where the renderable content item is an image, the rendering optimization parameters can comprise file format options and image quality options for the image. For example, in an embodiment where the renderable content item is a video, the wherein the rendering optimization parameters can comprise resolution options and/or bitrate options for the video. The set of client rendering options 125 can be provided to one or more client computing devices (e.g., 151) in a format that can be processed by the one or more client computing devices to select one or more of the options for rendering the renderable content item.

In at least some embodiments, generating the set of client rendering options 125 for the renderable content item can comprise generating identifiers for multiple versions of the renderable content item using the rendering specification 111 and the rendering optimization parameters 123, and replacing the placeholders in the template 121 with the generated identifiers. For example, the generated identifiers can comprise file names for multiple versions of the renderable content item that are generated using the rendering specification 111 and the rendering optimization parameters 123. The template placeholders can be replaced with the generated file names.

The rendering optimization parameters 123 can comprise settings that can affect rendering performance. For example, the rendering optimization parameters 123 can comprise settings that impact download time, rendering time, and/or rendering quality for the renderable content item. Such rendering optimization parameters 123 can comprise optimal size(s) for the renderable content item and/or optimal format(s) for the renderable content item. In at least some embodiments, rendering optimization parameters can be provided for different file formats, different client computing device types (such as mobile devices, desktop computers, televisions, etc.), and/or different geographic locations.

In at least some embodiments, the rendering optimization parameters 123 can be based on performance testing using the renderable content item and/or other renderable content items. For example, the example system 100 can comprise a third server computer 130 configured to perform performance testing and to determine the rendering optimization parameters 123 based on results 141 of the performance testing. The server computer 130 can transmit the rendering optimization parameters 123 to the second server computer 120. The performance testing can comprise processing requests for the renderable content item (e.g., 143) and/or other renderable content items (not shown). The server computer 130 can process such requests using multiple file formats, multiple file sizes, multiple quality settings, or some combination thereof. For example, the server computer 130 can receive requests from multiple client computing devices 151-155 and can assess the performance of processing such request with various optimization parameter combinations. In at least some embodiments, the server computer 130 can select combinations of file formats and quality settings for use in the performance testing from a larger set of possible file format and quality setting combinations. For example, a combination can be excluded in which a more modern file format would result in a larger file than a less modern file format. In at least some scenarios, excluding such combinations can rule out a number of ambiguous tests. Although a single server computer 130 is depicted, in at least some embodiments it is possible for these operations to be performed by multiple server computers.

In at least some such embodiments, the client computing devices 151-155 can participate in the performance testing by transmitting requests to the server computer 130 for different versions of the renderable content item and/or other renderable content items using various optimization parameter combinations. For example, the client computing devices 151-155 can transmit requests for the renderable content item and/or other renderable content items using various file formats, file sizes, quality settings, or some combination thereof.

The client computing devices 151-155 can comprise different types of computing devices (such as mobile devices, desktop computers, televisions, etc.). Additionally or alternatively, the client computing devices 151-155 can support different renderable content item file formats. Additionally or alternatively, the client computing devices 151-155 can comprise different web browsers that are used to render the renderable content item and/or other renderable content items. Additionally or alternatively, the client computing devices 151-155 can be located in different geographic regions (such as different cities, counties, states, countries, continents, etc.). Additionally or alternatively, the client computing devices 151-155 can have different connection bandwidths.

Additionally or alternatively, one or more other server computers (not shown) can participate in the performance testing by transmitting requests to the server computer 130 for versions of the renderable content item and/or other renderable content items using various optimization parameter combinations. In such an embodiment, the one or more other server computers can be configured to assess performance metrics for the requests (such as download speed, download file size, rendering processing time, etc.) and to compile performance test results from which the rendering optimization parameters 123 can be determined.

The second server computer 120 is configured to transmit the set of client rendering options 125 for the renderable content item to a client computing device (e.g., 151). The set of client rendering options 125 can comprise options for rendering the renderable content item based on the capabilities of the client computing device (e.g., 151) that receives the client rendering options 125. For example, the client rendering options 125 can identify different versions of the renderable content item that can be used to render the content item using different file formats, resolutions, file sizes, and/or rendering priorities.

In at least some embodiments, the second server computer 120 can be configured to generate the set of client rendering options 125 for the renderable content item and/or transmit the set of client rendering options 125 to the client computing device (e.g., 151) in response to receiving a request for a web page that includes the renderable content item. Additionally or alternatively, another server computer (such as a web server computer) can be configured to receive a request for the web page from the client computing device (e.g., 151) and can transmit a request to the second server computer 120 for the client rendering options 125. In such an embodiment, the second server computer 120 can be configured to transmit the client rendering options 125 to the other server computer. The other server computer can then incorporate the client rendering options 125 into a body of the web page that is transmitted to the client computing device. Additionally or alternatively, the other server computer can include a uniform resource locator (URL) in the body of the web page that, when processed by the client computing device, causes the client computing device to transmit a request for the set of client rendering options to the second server computer 120.

The client computing device that receives the client rendering options 125 can identify one or more of the rendering options that is/are supported by the client computing device's rendering capabilities and can transmit a request comprising the selected client rendering option to a server computer. For example, the server computer 130 can be configured to receive a request from the client computing device (e.g., 151), wherein the request comprises the client rendering option selected by the client computing device from the set of client rendering options 125. The server computer 130 can transmit a version of the renderable content item that conforms to the client rendering option to the client computing device 151. In at least some embodiments, the server computer 130 can generate the version of the renderable content item that conforms to the client rendering option in response to receiving the request from the client computing device. In some such embodiments, after generating the version of the renderable content item that conforms to the client rendering option, the server computer 130 can cache the version of the renderable content item for use in serving later requests.

Although FIG. 1 depicts the third server computer 130 a both generating the rendering optimization parameters 123 and processing requests from the client computing devices 151-155 for the renderable content item 143, in at least some embodiments, the operations can be performed by separate computing device. For example, one or more server computers can be configured to generate rendering optimization parameters 123 based on performance test results 141 and one or more other server computers can be configured to process requests for the renderable content item 143.

Optionally, the server computer 120 can be configured to provide the client rendering options 125 to the client computing device 151 in response to receiving a request 161 from the client computing device 151. In at least some such embodiments, the server computer 120 can generate the set of rendering options 125 for the renderable content item responsive to receiving the request 161 from the client computing device 151.

In at least some embodiments, the template 121 comprises a hypertext markup language (HTML) fragment that includes one or more partial HTML elements. In such an embodiment, the client rendering options 125 can comprise one or more complete HTML elements that are generated using the rendering specification 111, rendering optimization parameters 123, and the HTML fragment. In such an embodiment, the client rendering options 125 can be processed using a web browser (not shown) on the client computing device (e.g., 151).

In any of the embodiments described herein, a renderable content item comprises data that, when processed by a computing device using a rendering process, produces visual and/or audio output. Example renderable content items include image data, video data, text data, sound data, 3-D meshes, point clouds, and textures. Renderable content items can be associated with rendering specifications that are defined by application developers, web page designers, and/or other users. Example data included in rendering specifications content item identifiers, default rendering size information, default resolution information, rendering style information, rendering priority information, and rendering target information. Renderable content items can also be associated with rendering optimization parameters that are determined based on performance testing. Example rendering optimization parameters include file formats and quality settings for a renderable content item.

In any of the embodiments described herein, the term template refers to a structured data generation scheme, including static templates, dynamic templates, templating engines, templating programming languages, and the like.

Figure 2:
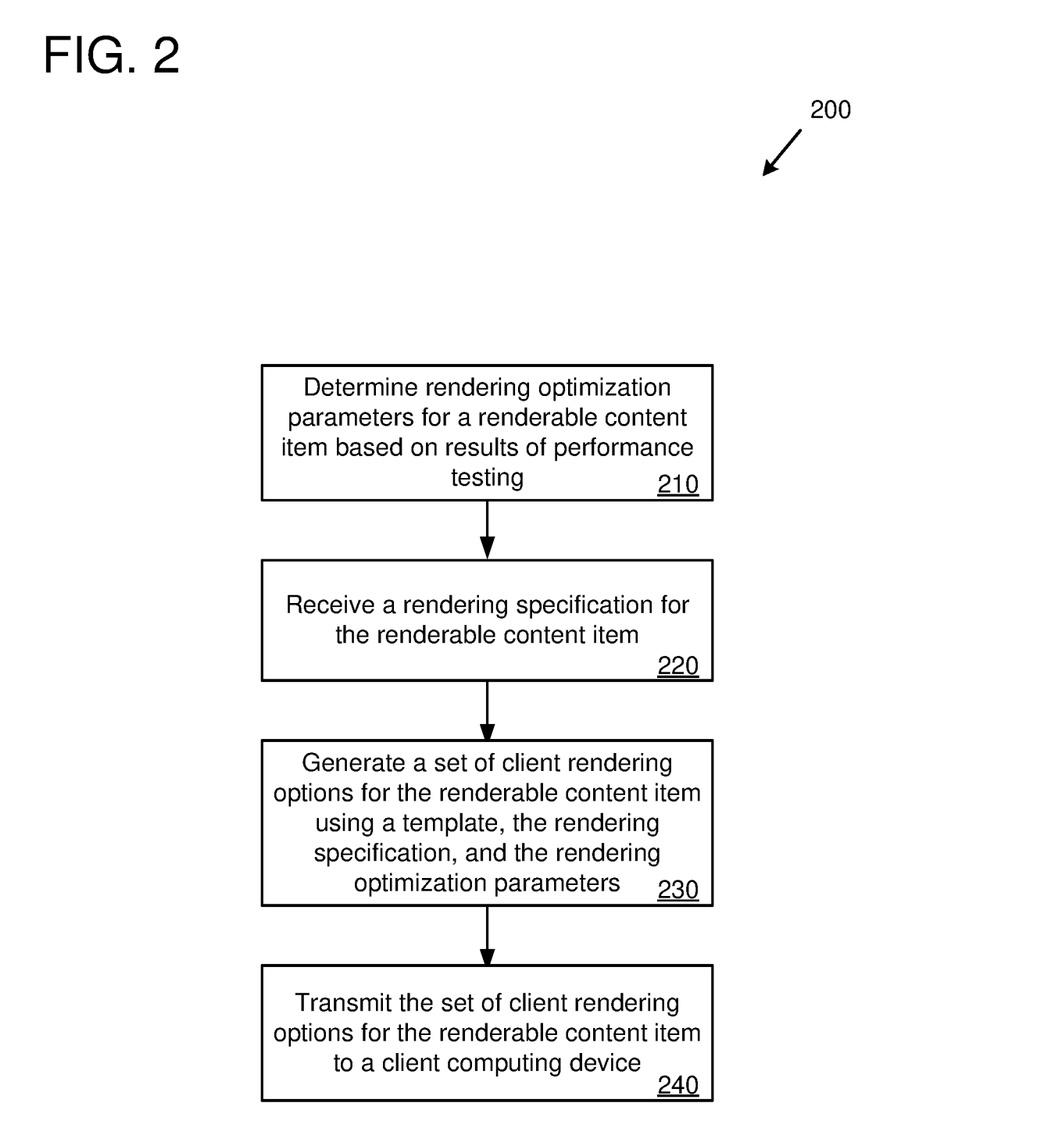
FIG. 2 is a flowchart of an example method for generating optimized client rendering options for a renderable content item.

FIG. 2 is a flowchart of an example method 200 for generating optimized client rendering options for a renderable content item. Any of the example computing devices depicted herein can be used to perform all or part of the example method 200. For example, one or more of the server computers depicted in FIGS. 1 (110, 120, 130, and 140) can be used to perform all or part of the example method 200. For example, the example computing device 310 depicted in FIG. 3 can be used to perform all or part of the example method 200.

Figure 3:
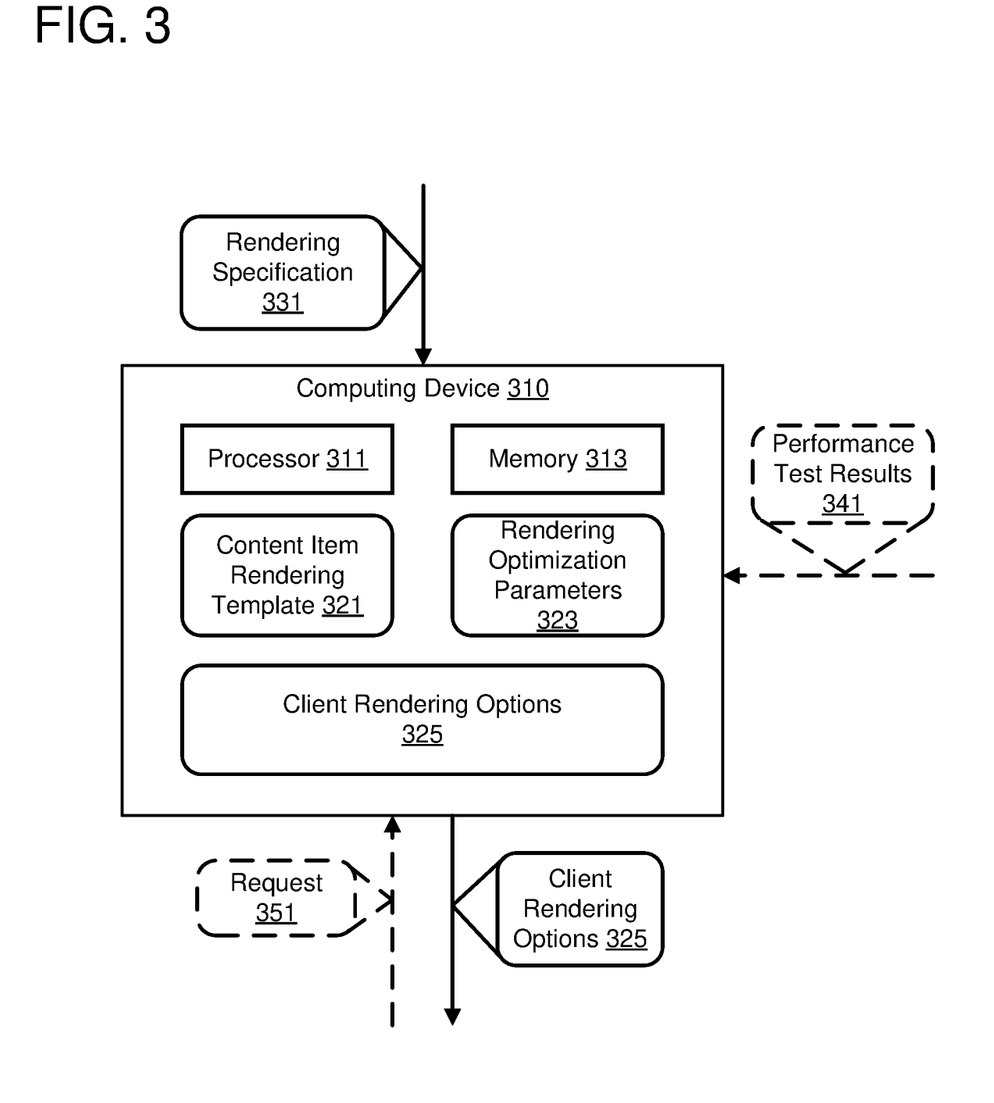
FIG. 3 is a diagram depicting an example computing device configured to generate optimized client rendering options for a renderable content item.

FIG. 3 is a diagram depicting an example computing device 310 configured to generate optimized client rendering options for a renderable content item. The example computing device 310 comprises a processor 311 and the memory 313. The memory 313 can store instructions that, when executed by the processor 311, cause the computing device 310 to perform operations as described herein.

Referring to FIG. 2, at 201, rendering optimization parameters are determined for a renderable content item based on results of performance testing. For example, the computing device 310 can determine rendering optimization parameters 323 based on results of performance testing. In at least some embodiments, the computing device 310 can be configured to perform performance testing for the renderable content item. Additionally or alternatively, the computing device 310 can receive performance test results 341 for the renderable content item.

In at least some embodiments, the example method 200 further comprises performing the performance testing for the renderable content item. Performing the performance testing can comprise processing requests for the renderable content item using multiple file format and quality setting combinations for the renderable content item. For example, the computing device 310 and/or one or more other computing devices can transmit requests for the renderable content item using different file format and quality setting combinations and can assess the relative rendering performance for different versions of the renderable content item that are based on the different file format and quality setting combinations. For example, performance information for processing a request for a version of the renderable content item using one file format and file quality setting can be determined and compared to performance information for processing another request for another version of the renderable content item using a different file format (or the same file format) and a different quality setting. In at least some embodiments, performing the performance testing comprises selecting the multiple file format and quality setting combinations for the renderable content item from a larger set of possible file format and quality setting combinations. For example, quality settings for a more modern file format that would result in a larger file size than the same quality setting in a less modern file format can be eliminated in some circumstances.

The performance test results can be used to select file format and quality setting combinations for inclusion in the rendering optimization parameters. For example, a quality setting with a best performance for each supported file format can be selected. In at least some embodiments, different rendering optimization parameters can be selected for different types of target computing devices (such as mobile devices, desktop computers, televisions, etc.). Additionally or alternatively, different rendering optimization parameters can be selected for different geographic regions and/or different connection bandwidths.

At 220, a rendering specification for the renderable content item is received. For example, the computing device 310 can receive a rendering specification 331 for the renderable content item. The rendering specification 331 can comprise settings specified by an application developer or web page designer for rendering the renderable content item. Example rendering specification settings include an identifier for the renderable content item (such as a unique identifier, a file name for an original version of the renderable content item, etc.), a default resolution (or intended resolution) for the renderable content item, a rendering position for the renderable content item (such as whether the renderable content item appears above or below a fold of a web page), style settings for the renderable content item (such as whether the renderable content item is cropped), and/or a rendering priority for the renderable content item with respect to one or more other renderable content items that are included in a same web page as the renderable content item. Additionally or alternatively, the rendering specification can comprise a target platform (such as WINDOWS, MACOS, IOS, ANDROID, Linux, etc.) and/or a target browser (such as CHROME, FIREFOX, EDGE, SAFARI, OPERA, etc.) of a client computing device.

At 230, a set of client rendering options for the renderable content item is generated using a template, the rendering specification, and the rendering optimization parameters. For example, the computing device 310 can generate a set of client rendering options 325 for the renderable content item using a template 321, the received rendering specification 331, and the rendering optimization parameters 323. In at least some embodiments, generating the set of client rendering options 325 for the renderable content item comprises replacing the placeholders in the template 321 with the values generated using the rendering specification 331 and the rendering optimization parameters 323.

At 240, the set of client rendering options for the renderable content item is transmitted to a client computing device. For example, the computing device 310 can transmit the client rendering options 325 to a client computing device (not shown). The computing device 310 can transmit the client rendering options 325 via one or more wired and/or wireless connections. In at least some embodiments, the client rendering options 325 can be transmitted via one or more computer networks. In some embodiments, the computing device 310 can transmit the client rendering options 325 in response to receipt of a request 351. In at least some such embodiments, the computing device 310 can generate the client rendering options 325 responsive to receipt of the request 351.

Upon receipt of the client rendering options, the client computing device can select one or more of the rendering options based on capabilities of the client computing device. For example, the client computing device can select one option that is associated with a file format that is supported by the client computing device and can discard another option that is associated with a file format that is not supported by the client computing device. Additionally or alternatively, the client computing device can select an option that is associated with a screen resolution of the client computing device and can discard another option that is associated with a screen resolution that is not supported (or is not optimal) for the client computing device.

In at least some embodiments, the template comprises a hypertext markup language (HTML) fragment. Additionally or alternatively, the renderable content item can comprise an image. In such an embodiment, the set of client rendering options can comprise image size options for the image, image file formats for the image, image quality options for the image, or some combination thereof. In a particular embodiment where the template comprises an HTML fragment and the renderable content item comprises an image, the set of client rendering options can comprise an HTML picture element.

Figure 4:
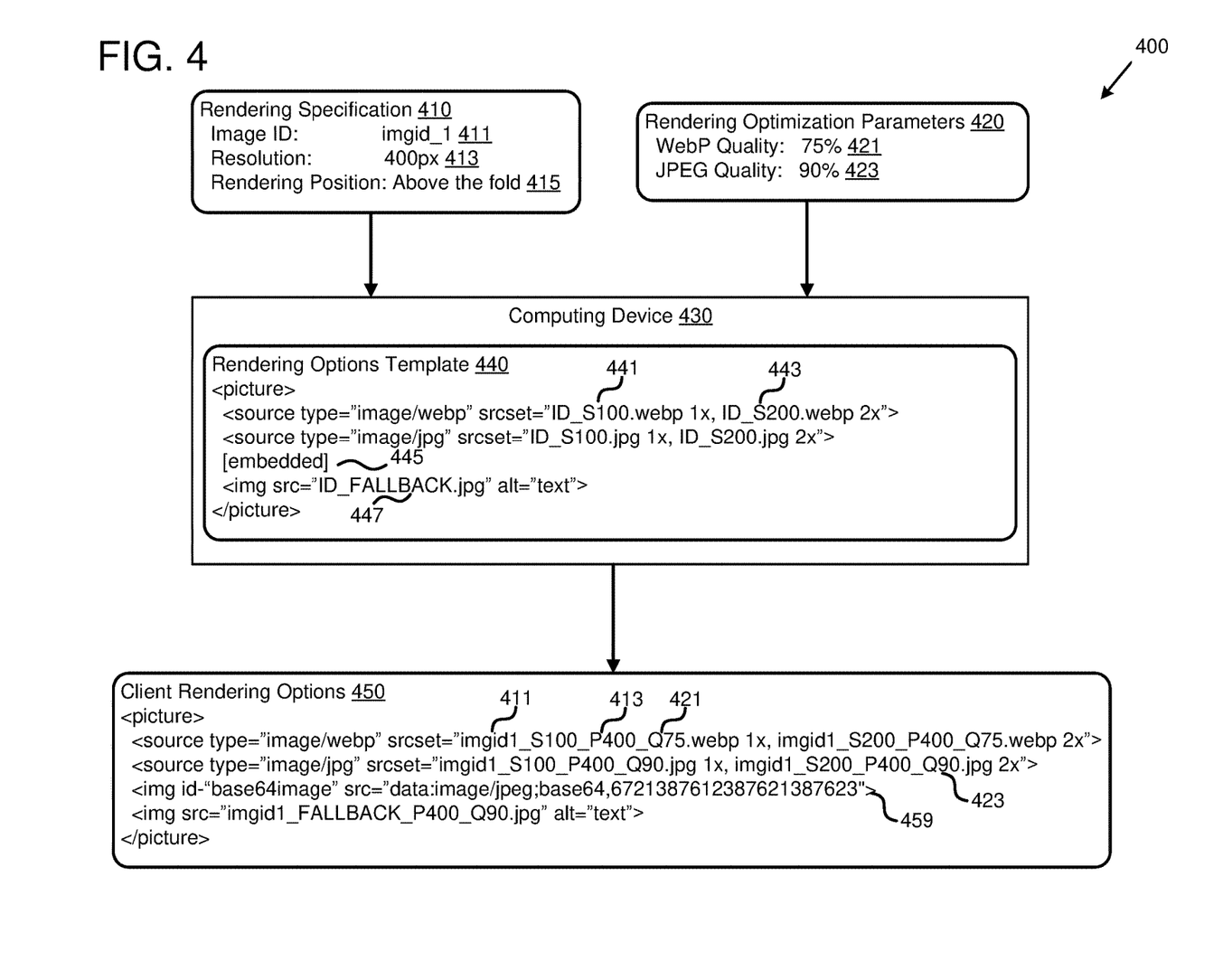
FIG. 4 is a diagram depicting an example system configured to generate client rendering options for an image.

FIG. 4 is a diagram depicting an example system 400 configured to generate client rendering options for an image. The example system 400 comprises a computing device 430 configured to receive a rendering specification 410 and rendering optimization parameters 420; and to generate client rendering options 450 using the rendering specification 410, the rendering optimization parameters 420, and a rendering options template 440. The example contents of the rendering specification 410, the rendering optimization parameters 420, the rendering options template 440, and the client rendering options 450 are provided for illustration purposes and are not intended to be limiting.

The example rendering specification 410 comprises an image identifier 411 for an image, a default image resolution 413 for the image, and a rendering position 415 for the image. In the example depicted in FIG. 4, the rendering position 415 indicates that the image should be rendered above the fold of a web page. The example rendering optimization parameters 420 comprise an image quality 421 associated with a WebP image format, and an image quality 423 associated with a JPEG image format. The rendering optimization parameters 420 can be determined based on the results of performance testing as described herein.

The example rendering options template 440 comprises a hypertext markup language (HTML) picture element that comprises multiple child elements that include template placeholders 441-447. The value of the template placeholder 441 indicates that the placeholder 441 should be replaced with a label associated with a version of the image that has a resolution that is one hundred percent of a native resolution of the image. The value of the template placeholder 443 indicates that the placeholder 443 should be replaced with a label that is associated with a version of the image that has a resolution that is two hundred percent of the native resolution of the image. The value of the template placeholder 445 indicates that, if an embedded version of the image is included in the client rendering options 450, then the embedded version of the image should replace the template placeholder 445. The value of the template placeholder 447 indicates that the placeholder 447 should be replaced with a label that is associated with a fallback version of the image.

The computing device 430 is configured to replace the template placeholder 441 with a label that is generated using the rendering specification 410 and the rendering optimization parameters 420. When generating the client rendering options 450, the computing device 430 replaces the template placeholder 441 with a label that includes the image identifier 411 and the default resolution 413. Since the template placeholder 441 is associated with the WebP image format, the computing device 430 includes the quality setting 421 that is associated with the WebP image format in the label as well. The label also indicates that the version of the image it is associated with should have one hundred percent of the image's default resolution.

The computing device 430 replaces the template placeholder 443 with a label that also includes the image identifier 411, the default pixel resolution 413, and the quality setting 421 associated with the WebP image format. However, the label, like the placeholder 443, indicates that the version of the image it is associated with should have two hundred percent of the image's default resolution.

The computing device 430 also replaces the template placeholders 441 and 443 in the source child element associated with the JPEG (or "jpg") image format with labels that include the image identifier 411 and the default image resolution 413. However, these labels include the quality setting 423 that is associated with the JPEG image format instead of the quality setting 421 that is associated with the WebP image format.

The computing device 430 can be configured to consider an intended rendering position of the image when constructing the client rendering options 450. For example, the computing device 430 can analyze the rendering position 415 in the rendering specification 410 and determine that the image is located above the fold of a web page. Based on this determining, the computing device 430 can replace the template placeholder 445 with an embedded representation 459 of the image. In the example depicted in FIG. 4, the embedded representation of the image is a base64 image. However, other embedded representations of images are possible. In at least some scenarios, including the embedded representation 459 of the image can allow a client computing device to quickly load the embedded representation of the image while a higher resolution version of the image associated with one of the other options is downloaded. Additionally or alternatively, a network connection speed and/or geographical location of a client computing device can be considered by the computing device 430 when determining whether or not to include an embedded version of the image in the client rendering options 450. For example, if a client device has limited connectivity, load times for the image may be reduced by including an embedded version of the image in some cases. However, in some other cases, load times may be increased overall for web page by omitting embedded versions of images. The computing device 430 can be configured to consider the image's rendering position within a web page, embedded image size, client connection speed, client geographical location, and/or the size of the web page when determining whether or not include an embedded version of the image in the client rendering options 450.

Additionally or alternatively, the computing device 430 can choose different rendering optimization parameters based on the intended rendering position of the image. For example, the computing device 430 can determine, based on the rendering position 415, that the image needs to load quickly since it is positioned above the fold of a web page. Based on this determining, the computing device 430 can select rendering optimization parameters from the rendering optimization parameters 420 that will cause the image to load more quickly (for example by reducing image quality in exchange for a smaller download size). In at least some such embodiments, the rendering optimization parameters 420 can include multiple sets of rendering optimization parameters (not shown) that are associated with different rendering priorities and/or network connection speeds.

The client computing device 430 replaces the template placeholder 447 with a label associated with a fallback version of the image. The label associated with the fallback version of the image includes the image identifier 411 and the default resolution 413. Since the template placeholder 447 is associated with the JPEG image format, the label associated with the fallback version of the image includes the quality setting 423 associated with the JPEG image format.

After generating the client rendering options 450, the computing device 430 can transmit the client rendering options 450 to one or more client computing devices. A client computing device, upon receipt of the client rendering options 450, can select one or more of the options for rendering the image.

Figure 5:
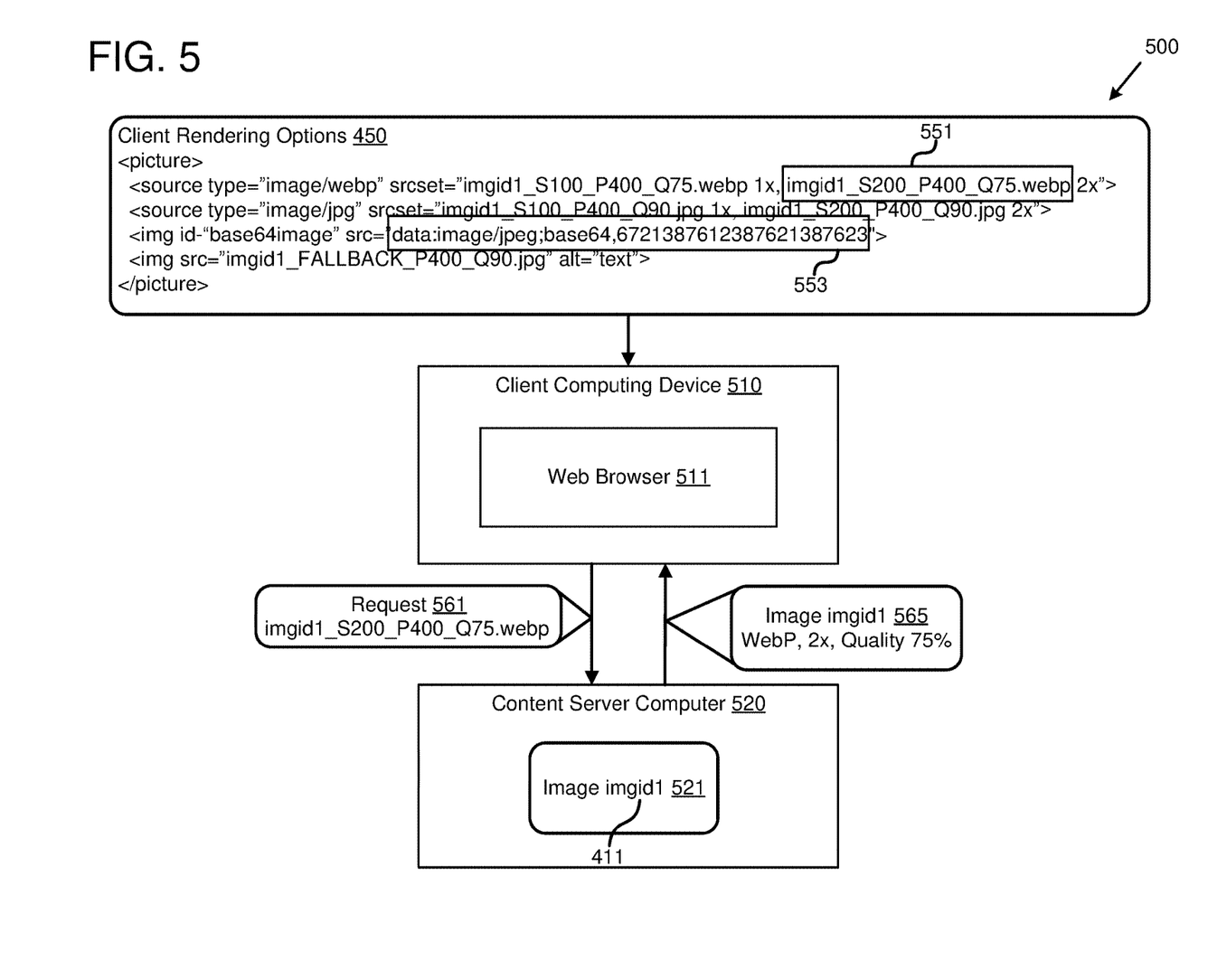
FIG. 5 is a diagram depicting an example system comprising a client computing device configured to select a client rendering option for rendering an image.

FIG. 5 is a diagram depicting an example system 500 comprising a client computing device 510 configured to select a client rendering option for rendering an image. The client computing device 510 is configured to receive the client rendering options 450 that were generated by the computing device 430 (depicted in FIG. 4). The client computing device 510 comprises a web browser 511 that is configured to select one or more of the rendering options in the client rendering options 450 for rendering an image 521 based on capabilities of the client computing device 510. For example, the web browser 511 can determine that the client computing device 510 supports the WebP image format, and has a 2x screen resolution. Based on this determining, the web browser can select the label 551 that is associated with a version of the image that is in the WebP format and that is intended for devices with 2x screen resolutions.

The client computing device transmits the label 551 as part of a request 561 to a content server computer 520 that is storing the image 521 in association with the image identifier 411. The content server computer 420 can parse the label 551 in the request 561 and can determine that the request is for a version of the image 521 that is in the WebP format, two hundred percent of the native resolution of 400 pixels of the image 521, and that has a 75% quality setting. The content server computer 520 can identify a version 565 of the image 521 that matches these specifications and can transmit the version 565 of the image 521 to the client computing device 510. Upon receipt of the version 565 of the image 521, the web browser 511 can render the version 565 of the image 521.

In at least some embodiments, the content server computer 520 can be configured to generate the version 565 of the image 521 if a version of the image 521 that matches the specifications in the label 551 does not already exist. In such an embodiment, the content server computer 520 can cache the version 565 of the image 521 after generating. The cached version 565 of the image 521 can then be used to service additional requests that include the label 551. The content server computer 520 can be configured to generate and cache multiple different versions of the image 521 in association with multiple image labels.

The web browser 511 can determine that the client rendering options 450 include an embedded version 553 of the image 521. The web browser 511 can render the embedded version 553 of the image 521 while the request 561 is transmitted to the content server computer 520 and the version 565 of the image 521 is downloaded.

Although the examples depicted in FIGS. 4 and 5 involve an image, similar techniques can be used to generate client rendering options for other types of renderable content items (such as videos, text, etc.).

Although a single content server computer 520 is depicted in FIG. 5, in at least some embodiments, multiple content server computers can be configured to process requests for the image 521 and/or other renderable content items. For example, a plurality of server computers organized in a content distribution network (CDN) can be configured to process requests for the image 521 and multiple other renderable content items.

Figure 6:
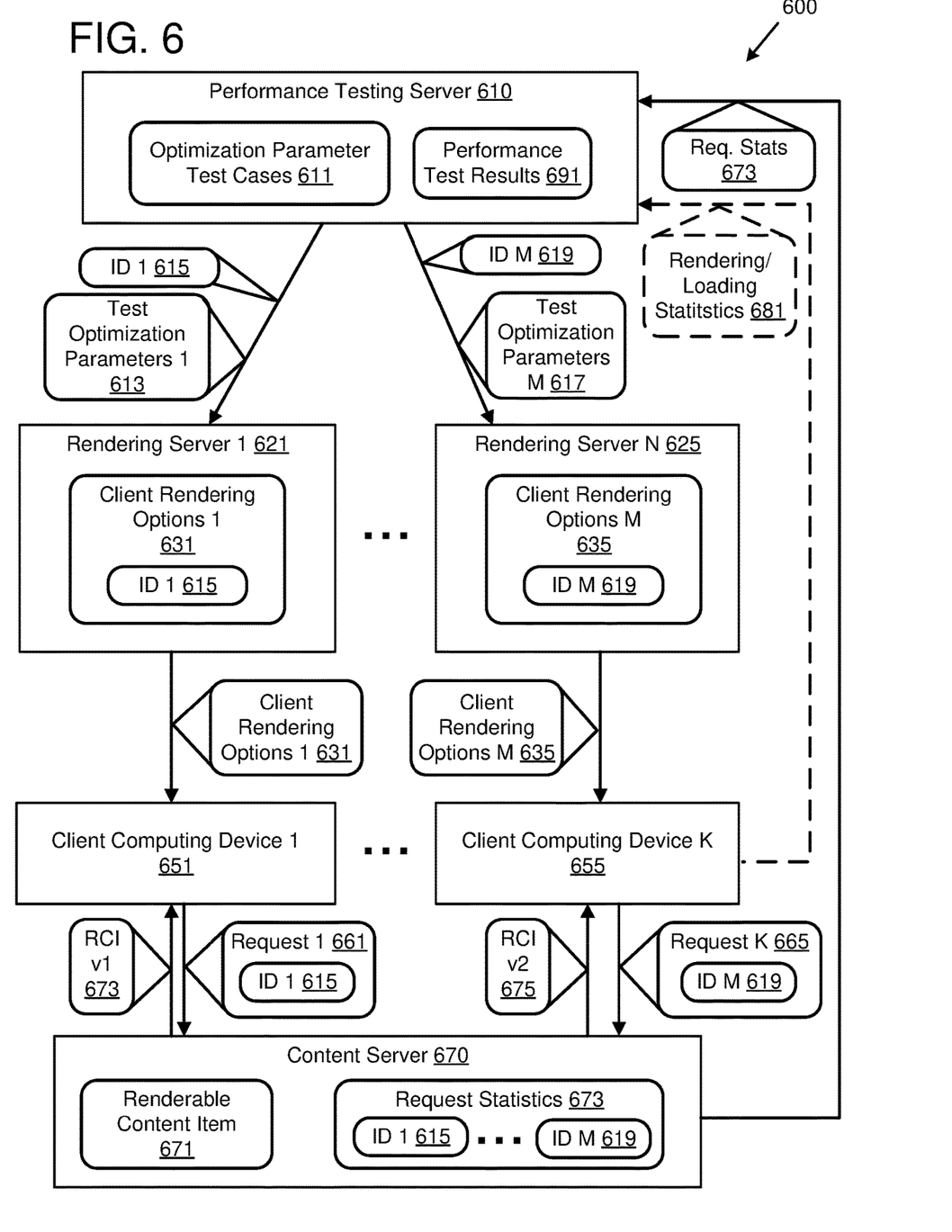
FIG. 6 is a system diagram depicting an example system 600 configured to perform performance testing and identify rendering optimization parameters based on the results of the performance testing.

FIG. 6 is a system diagram depicting an example system 600 configured to perform performance testing and identify rendering optimization parameters based on the results of the performance testing. The example system 600 comprises a performance testing server 610, a plurality of rendering servers 621-625, a plurality of client computing devices 651-655, and a content server 670.

The performance testing server 610 is configured to generate a plurality of optimization parameter test cases 611. The optimization parameter test cases 611 can be used by the performance testing server 610 to generate multiple sets of rendering optimization parameters (e.g. 613 and 617) for use in testing rendering options for a renderable content item 671. In at least some embodiments, the optimization parameter test cases 611 can comprise multiple file format and quality setting combinations for the renderable content item 671. The performance testing server 610 can transmit different test rendering optimization parameters to the plurality of rendering servers 621-625. The performance testing server 610 can also transmit unique identifiers (e.g., 615 and 619) associated with the different test optimization parameters (e.g., 613 and 617) to the plurality of rendering servers 621-625. For example, the performance testing server 610 can transmit a first set of rendering optimization parameters 613 and an associated identifier 615 to the rendering server 621; and the performance testing server 610 can transmit a different set of rendering optimization parameters 617 and a different identifier 619 to the rendering server 625. The identifiers (e.g., 615 and 619) that are associated with the rendering optimization parameters (e.g., 613 and 617) are used to track results associated with the different rendering optimization parameters (e.g., 613 and 617).

The identifiers can be associated with the different optimization parameter test cases 611. For example, the test cases can comprise various combinations of file formats, quality settings, target client computing device platforms, target client computing device browsers, and/or target rendering servers. In at least some embodiments, the identifiers can be associated with a particular set of rendering optimization parameters and a rendering server to which the set of optimization parameters was sent. For example, the same set of rendering optimization parameters can be transmitted to multiple rendering servers (such as different rendering servers located in different data centers and/or different geographic locations). In such a scenario, different identifiers can be transmitted along with the set of rendering optimization parameters to the different rendering servers.

The plurality of rendering servers 621-625 are configured to generate sets of client rendering options for the renderable content item 671 using the different sets of rendering optimization parameters. For example, the rendering server 621 can generate a set of client rendering options 631 using the rendering optimization parameters 613 and the rendering server 625 can generate a set of client rendering options 635 using the rendering optimization parameters 617. Generating a set of client rendering options can comprise generating client rendering options using a template, a rendering specification, and a given set of rendering optimization parameters (e.g. 613 or 617) as described herein. However, in some embodiments the sets of client rendering options generated for use in the performance testing may be generated differently.

The generated sets of client rendering options comprise the identifiers transmitted to the rendering servers 621-625 by the performance testing server 610. For example, the set of client rendering options 631 comprises the identifier 615 and the set of client rendering options 635 comprise the identifier 619. In at least some embodiments, the identifier is incorporated into labels (such as filenames, URLs, etc.) associated with the various rendering options defined in the set of client rendering options. For example, in an embodiment where a set of client rendering options is generated using a template, the template can include placeholders associated with the various rendering options that can be replaced by the provided identifier.

The plurality of rendering servers 621-625 can transmit the generated sets of client rendering options to the plurality of client computing devices 651-655. For example, the rendering server 621 can transmit the client rendering options 631 to the client computing device 651 and the rendering server 625 can transmit the client rendering options 635 to the client computing device 655. The plurality of client computing devices 651-655 can select one or more rendering options for the renderable content item 671 that are defined in the received sets of client rendering options and can transmit requests (e.g., 661 and 665) for versions of the renderable content item 671 based on the selected rendering options. The generated requests (e.g., 661 and 665) comprise the identifiers included in the sets of client rendering options. For example, the request 661 includes the identifier 615 that was included in the client rendering options 631, and the request 665 includes the identifier 619 that was included in the set of client rendering options 635. In at least some embodiments, the identifiers can be included in labels (such as filenames, URLs, etc.) that also identify various versions of the renderable content item 671.

The content server 670 can be configured to provide different versions of the renderable content item 671 in response to the requests from the plurality of client computing devices 651-655. For example, the content server 670 can provide a first version 673 of the renderable content item 671 to the client computing device 651 in response to the request 661, and the content server 670 can provide a second version 675 to the client computing device 655 in response to the request 665. Additionally or alternatively, the content server 670 can provide a same version of the renderable content item 671 to various client computing devices. For example, a same set of client rendering options may be provided to multiple client computing devices of the plurality of client computing devices 651-655. Additionally or alternatively, a same rendering option for the renderable content item 671 may be selected by multiple client computing devices of the plurality of client computing devices 651-655.

The content server 670 can be configured to track statistics 673 based on the requests received from the plurality of client computing devices 651-655. For example, the content server 670 can store information related to the identifiers (e.g., 615 and 619) received in the requests (e.g. 661 and 665), and the associated versions of the renderable content item 671 that were selected by the plurality of client computing devices 651-655. The statistics 673 can be transmitted by the content server 670 to the performance testing server 610. The performance testing server 610 can use the information related to the identifiers (e.g. 615 and 619) and the versions of the renderable content item 671 that were selected by the plurality of client computing devices 651-655 to generate performance test results 691. For example, the performance testing server 610 can use the identifiers (e.g., 615 and 619) to correlate the selected versions of the renderable content item 671 with test cases in the optimization parameter test cases 611 associated with the identifiers. In at least some embodiments, the statistics 673 can also include information related to the plurality of client computing devices 651-655 that transmitted the requests (e.g. 661 and 665). Such information can include platform information for the client computing devices 651-655, browser information for the client computing devices 651-655, and/or geographic locations of the client computing devices 651-655. Thus, in at least some scenarios the performance testing server 610 can use the statistics 673 and the associated identifiers to identify a particular set of rendering optimization parameters (e.g. 613), the rendering server (e.g. 621) to which the set of rendering optimization parameters percent, information about the client computing device to which the set of client rendering options (e.g., 631) was transmitted, and the rendering option that was ultimately selected by the client computing device. The performance testing server 610 can compile this information for all of the requests made by the plurality of client computing devices 651-655 based on the sets of client rendering options generated using the different test sets of rendering optimization parameters and generate the performance test results 691.

Optionally, one or more of the plurality of client computing devices 651-655 can be configured to transmit rendering and/or loading statistics 681 for the renderable content item 671 to the performance testing server 610. Example rendering and/or loading statistics 681 include latency data associated with rendering options for the renderable content item 671 that were selected by the plurality of client computing devices 651-655. For example, the client computing device (e.g., 655) can be configured to determine a download time and/or a rendering time for a version (e.g., 675) of the renderable content item 671 that was selected by the client computing device from a set of client rendering options (e.g., 635) that were provided to the client computing device by a rendering server (e.g., 625). Additional information that can be provided in the rendering and/or loading statistics 681 can include a platform of the client computing device, a browser of the client computing device, a network connection Speed of the client computing device, a geographic location of the client computing device, and/or device capabilities of the client computing device. These rendering and/or loading statistics 681 can be used by the performance testing server 610 in determining the performance test results 691.

The performance test results 691 can be used to generate one or more sets of rendering optimization parameters for use in generating sets of client rendering options for the renderable content item 671 as described herein. For example, but transmitting the different sets of client rendering options to similarly situated client computing devices (e.g., a same platform, a same browser, similar device capabilities, similar connection speeds, similar geographic locations, etc.) and determining which rendering options are selected by the client computing devices from the different sets of client rendering options, the performance testing server 610 can determine which of various optimization parameters for the renderable content item 671 are likely to be selected as best choices for rendering the renderable content item 671 by the similarly situated client computing devices. This information can be used to generate a set of rendering optimization parameters that is associated with a client computing device profile based on the similarly situated client computing devices. This set of client rendering optimization parameters can then be used to generate sets of client rendering options for client computing devices that match the client computing device profile.

Figure 7:
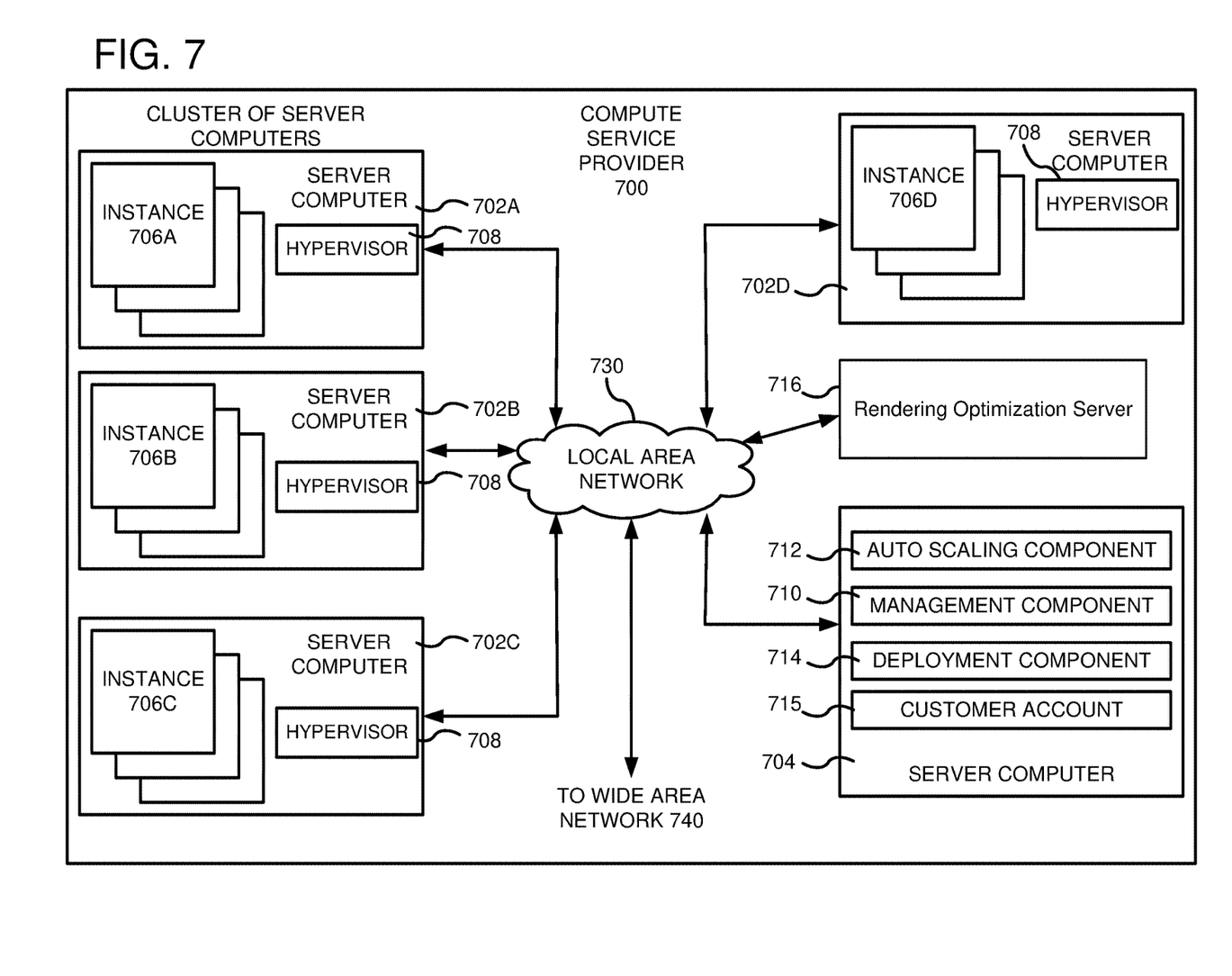
FIG. 7 is an example system diagram depicting a plurality of virtual machine instances running in a multi-tenant environment.

FIG. 7 is a computing system diagram of a network-based compute service provider 700 that illustrates one environment in which embodiments described herein can be used. By way of background, the compute service provider 700 (i.e., the cloud provider) is capable of delivery of computing and storage capacity as a service to a community of end recipients. In an example embodiment, the compute service provider can be established for an organization by or on behalf of the organization. That is, the compute service provider 700 may offer a "private cloud environment." In another embodiment, the compute service provider 700 supports a multi-tenant environment, wherein a plurality of customers operate independently (i.e., a public cloud environment). Generally speaking, the compute service provider 700 can provide the following models: Infrastructure as a Service ("IaaS"), Platform as a Service ("PaaS"), and/or Software as a Service ("SaaS"). Other models can be provided. For the IaaS model, the compute service provider 700 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 700 using networked client devices, such as desktop computers, laptops, tablets, smartphones, etc. running web browsers or other lightweight client applications. Those skilled in the art will recognize that the compute service provider 700 can be described as a "cloud" environment.

The particular illustrated compute service provider 700 includes a plurality of server computers 702A-702D. While only four server computers are shown, any number can be used, and large centers can include thousands of server computers. The server computers 702A-702D can provide computing resources for executing software instances 706A-706D. In one embodiment, the instances 706A-706D are virtual machines. As known in the art, a virtual machine is an instance of a software implementation of a machine (i.e. a computer) that executes applications like a physical machine. In the example, each of the servers 702A-702D can be configured to execute a hypervisor 708 or another type of program configured to enable the execution of multiple instances 706 on a single server. For example, each of the servers 702A-702D can be configured (e.g., via the hypervisor 708) to support one or more virtual machine slots, with each virtual machine slot capable of running a virtual machine instance (e.g., server computer 702A could be configured to support three virtual machine slots each running a corresponding virtual machine instance). Additionally, each of the instances 706 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 704 can be reserved for executing software components for managing the operation of the server computers 702 and the instances 706. For example, the server computer 704 can execute a management component 710. A customer can access the management component 710 to configure various aspects of the operation of the instances 706 purchased by the customer. For example, the customer can purchase, rent, or lease instances and make changes to the configuration of the instances. The customer can also specify settings regarding how the purchased instances are to be scaled in response to demand. The management component can further include a policy document to implement customer policies. An auto scaling component 712 can scale the instances 706 based upon rules defined by the customer. In one embodiment, the auto scaling component 712 allows a customer to specify scale-up rules for use in determining when new instances should be instantiated and scale-down rules for use in determining when existing instances should be terminated. The auto scaling component 712 can consist of a number of subcomponents executing on different server computers 702 or other computing devices. The auto scaling component 712 can monitor available computing resources over an internal management network and modify resources available based on need.

A deployment component 714 can be used to assist customers in the deployment of new instances 706 of computing resources. The deployment component can have access to account information associated with the instances, such as who is the owner of the account, credit card information, country of the owner, etc. The deployment component 714 can receive a configuration from a customer that includes data describing how new instances 706 should be configured. For example, the configuration can specify one or more applications to be installed in new instances 706, provide scripts and/or other types of code to be executed for configuring new instances 706, provide cache logic specifying how an application cache should be prepared, and other types of information. The deployment component 714 can utilize the customer-provided configuration and cache logic to configure, prime, and launch new instances 706. The configuration, cache logic, and other information may be specified by a customer using the management component 710 or by providing this information directly to the deployment component 714. The instance manager can be considered part of the deployment component.

Customer account information 715 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 730 can be utilized to interconnect the server computers 702A-702D and the server computer 704. The network 730 can comprise Clos networks or other types of multi-tiered network fabrics. The network 730 can be a local area network (LAN) and can be connected to a Wide Area Network (WAN) 740 so that end users can access the compute service provider 700. It should be appreciated that the network topology illustrated in FIG. 7 has been simplified and that many more networks and network devices can be utilized to interconnect the various computing systems disclosed herein.

One or more of the instances 706 can be configured to generate rendering specifications for renderable content items as described herein. Additionally or alternatively, one or more of the instances 706 can be configured to generate rendering optimization parameters for renderable content items as described herein. For example, one or more of the instances 706 can be configured to perform performance testing operations as described herein. Additionally or alternatively, a rendering server 716 can be configured to participate in such performance testing. Additionally or alternatively, computing devices external to the compute service provider 700 can participate in such performance testing. For example computing devices connected to the compute service provider 700 via the wide area network 740 can be configured to communicate with one or more of the instances 706.

The rendering server 716 can be configured to generate or receive rendering optimization parameters for the renderable content item, and to receive a rendering specification for the renderable content item. The rendering server 716 can generate the set of client rendering options for the renderable content item using a rendering template for the renderable content item, the rendering specification for the renderable content item, and the rendering optimization parameters for the renderable content item. The rendering server 716 can transmit the set of client rendering options for the renderable content item to one or more client computing devices via the local area network 730 and the wide area network 740.

Although a single rendering server 716 is depicted in FIG. 7, this is not intended to be limiting. Multiple rendering servers are also possible. In such an embodiment, multiple rendering servers can be configured to generate sets of client rendering options as described herein.

Figure 8:
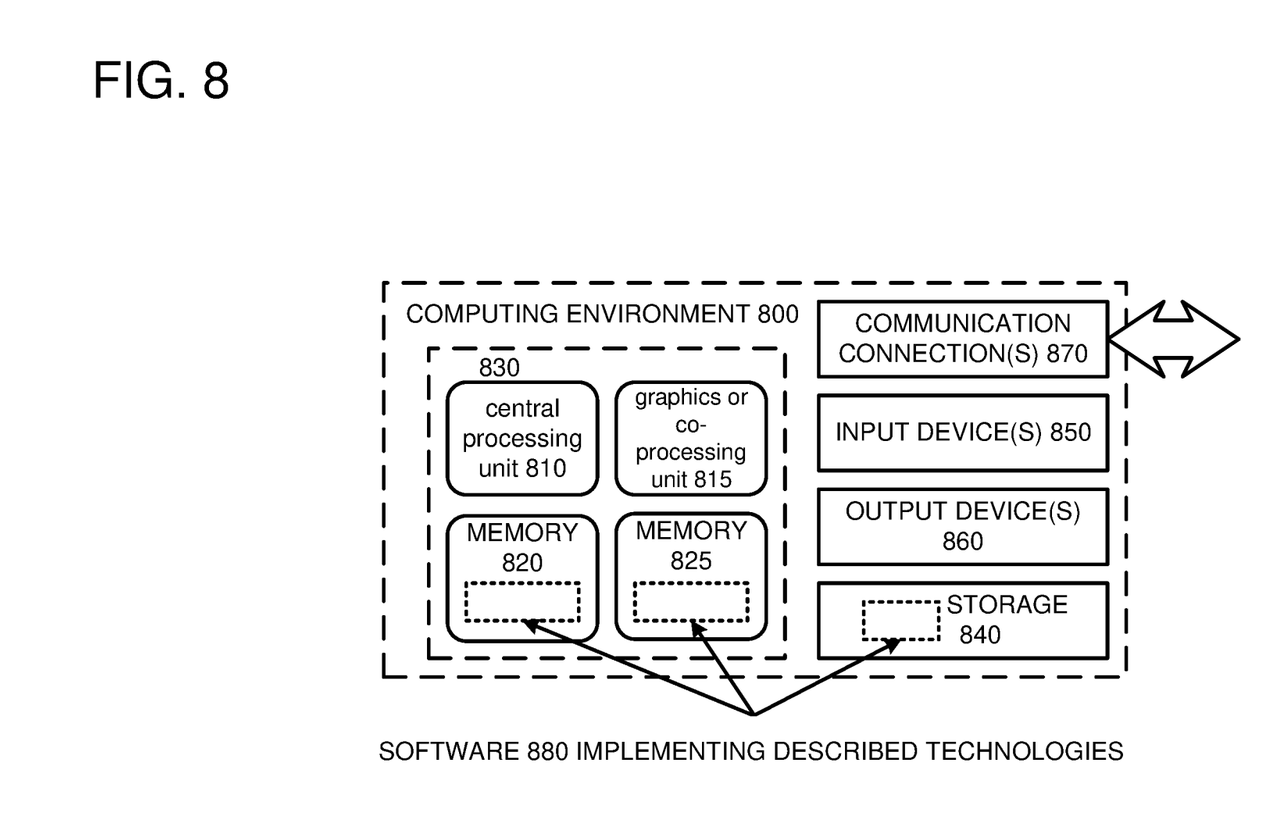
FIG. 8 is a diagram depicting a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, mobile device, tablet computer, etc.).

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 can store software 880 implementing one or more innovations described herein, (for example, in the form of computer-executable instructions suitable for execution by the processing unit(s)). In at least some embodiments, the computing environment 800 can comprise a server computer or computing device as described herein.

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 can store instructions for the software 880 implementing one or more innovations described herein (for example in a storage medium and/or firmware of the storage 840).

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier. In at least some embodiments, the communication connection(s) can connect the computing environment 800 to one or more computer networks.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, assembly language, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-Specific Integrated Circuits (ASICs), Program-Specific Standard Products (ASSPs), System-On-a-Chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A system comprising:
   a first server computer, configured to:
     generate rendering parameters for a renderable content item that is rendered as part of a web page, and
     transmit the rendering parameters to a second server computer; and
   the second server computer, wherein the second server computer is configured to:
     receive the rendering parameters from the first server computer,
     generate a set of client rendering options for the renderable content item using a template, the rendering parameters, and rendering optimization parameters for the renderable content item that are based on performance testing,
     transmit the set of client rendering options for the renderable content item to a client computing device; and
     receive a request from the client computing device, wherein the request comprises a client rendering option, from the set of client rendering options, selected by the client computing device;
   a third server computer physically separate from the first and second server computers, wherein the third server computer is configured to:
     perform performance tests based upon interactions with the client computing device through receipt of requests from the client computing device at the third server computer such that the client computing device participates in the performance testing with the third server computer, wherein the performance tests comprises processing requests for the renderable content item using multiple file format and quality setting combinations for the renderable content item;
     determine the rendering optimization parameters based on results of the performance testing; and
     transmit the rendering optimization parameters to the second server computer.

2. The system of claim 1, wherein the generating the set of client rendering options for the renderable content item comprises:
   generating file names for multiple versions of the renderable content item using the rendering parameters and the rendering optimization parameters; and
   replacing placeholders in the template with the generated file names.

3. The system of claim 1, wherein the third server computer is further configured to:
   select the multiple file format and quality setting combinations for the renderable content item from a larger set of possible file format and quality setting combinations.

4. The system of claim 1, wherein the template comprises a hypertext markup language (HTML) fragment.

5. The system of claim 1, further comprising a third server computer, wherein the third server computer is configured to:
   generate a version of the renderable content item that conforms to the client rendering option; and
   transmit the generated version of the renderable content item to the client computing device.

6. The system of claim 1, wherein the second server computer is further configured to:
   generate the set of client rendering options for the renderable content item and transmit the set of client rendering options to the client computing device responsive to receiving a request for the web page.

7. A method, comprising:
   performing performance testing through receipt of requests from a client computing device at a server computer so that the client computing device participates in the performance testing;
   determining, based on results of the performance testing, rendering optimization parameters for a renderable content item, wherein the performance testing comprises processing requests for the renderable content item using multiple file format and quality setting combinations for the renderable content item;
   receiving rendering parameters for the renderable content item;
   generating a set of client rendering options for the renderable content item using a template, the rendering parameters, and the rendering optimization parameters;
   transmitting the set of client rendering options for the renderable content item to the client computing device; and
   receiving a request from the client computing device, wherein the request comprises a client rendering option, from the set of client rendering options, selected by the client computing device.

8. The method of claim 7, wherein generating the set of client rendering options for the renderable content item comprises replacing placeholders in the template with values generated using the rendering parameters and the rendering optimization parameters.

9. The method of claim 7, wherein performing the performance testing further comprises selecting the multiple file format and quality setting combinations for the renderable content item from a larger set of possible file format and quality setting combinations.

10. The method of claim 7, wherein the renderable content item comprises a video and the set of client rendering options comprise resolution options and/or bitrate options for the video.

11. The method of claim 7, wherein the rendering parameters comprise a rendering priority for the renderable content item with respect to one or more other renderable content items, wherein the renderable content item and the one or more other renderable content items are included in a same web page.

12. A computing device, comprising:
   a processor; and a memory storing instructions that, when executed by the processor, cause the computing device to perform operations, the operations comprising:

performing performance tests through receipts of requests from a client computing device;

receiving results of performance testing for a renderable content item, wherein the performance testing comprises processing requests for the renderable content item using multiple file format and quality setting combinations for the renderable content item;

determining, based on the results of performance testing, rendering optimization parameters for the renderable content item;

receiving rendering parameters for the renderable content item;

generating a set of client rendering options for the renderable content item using a template, the received rendering parameters, and the rendering optimization parameters;

transmitting the set of client rendering options for the renderable content item to the client computing device; and receiving a request from the client computing device, wherein the request comprises a client rendering option, from the set of client rendering options, selected by the client computing device.

13. The computing device of claim 12, wherein generating the set of client rendering options for the renderable content item comprises replacing placeholders in the template with values generated using the rendering parameters and the rendering optimization parameters.

14. The computing device of claim 12, wherein the rendering parameters comprise a rendering priority for the renderable content item with respect to one or more other renderable content items, wherein the renderable content item and the one or more other renderable content items are included in a same web page.

15. The computing device of claim 12, wherein the rendering parameters comprise a target platform of the client computing device.

16. The computing device of claim 12, wherein the template comprises a hypertext markup language (HTML) fragment.

17. The computing device of claim 12, wherein the renderable content item comprises an image and the set of client rendering options comprise image quality options for the image.

18. The computing device of claim 17, wherein the set of client rendering options comprises an HTML picture element.

* * * * *